United States Patent
Berks et al.

(10) Patent No.: US 7,099,889 B2
(45) Date of Patent: Aug. 29, 2006

(54) SYSTEM AND METHOD FOR DECOUPLING OBJECT IDENTIFICATION FOR THE PURPOSE OF OBJECT SWITCHING IN DATABASE SYSTEMS

(75) Inventors: Robert T. Berks, Auckland (NZ); Miroslaw Adam Flasza, Pickering (CA); Matthew Albert Huras, Ajax (CA); Leo Tat Man Lau, Richmondhill (CA); Keriley K. Romanufa, Scarborough (CA); Aamer Sachedina, Newmarket (CA); Michael Jeffrey Winer, Markham (CA)

(73) Assignee: International Business Machines Corporation, Armonk, NY (US)

( * ) Notice: Subject to any disclaimer, the term of this patent is extended or adjusted under 35 U.S.C. 154(b) by 492 days.

(21) Appl. No.: 10/425,754

(22) Filed: Apr. 29, 2003

(65) Prior Publication Data
US 2004/0220940 A1    Nov. 4, 2004

(30) Foreign Application Priority Data
Mar. 14, 2003    (CA) .................................... 2422161

(51) Int. Cl.
*G06F 17/00* (2006.01)
*G06F 15/16* (2006.01)
*G06F 9/44* (2006.01)

(52) U.S. Cl. ................. 707/103; 707/203; 707/200; 707/204; 707/101; 707/8; 707/10; 709/229; 709/201; 717/165

(58) Field of Classification Search ............. 707/1–10, 707/200, 201, 204, 101; 395/600; 709/201
See application file for complete search history.

(56) References Cited

U.S. PATENT DOCUMENTS

| | | | | |
|---|---|---|---|---|
| 5,355,477 | A | * | 10/1994 | Strickland et al. ............. 707/8 |
| 5,459,860 | A | * | 10/1995 | Burnett et al. ............. 707/101 |
| 5,737,536 | A | * | 4/1998 | Herrmann et al. .......... 709/229 |
| 5,892,513 | A | | 4/1999 | Fay ............................ 345/357 |
| 6,026,410 | A | | 2/2000 | Allen et al. ................. 707/104 |
| 6,067,559 | A | | 5/2000 | Allard et al. ............... 709/202 |
| 6,092,130 | A | | 7/2000 | Horiike ...................... 710/69 |
| 6,173,289 | B1 | | 1/2001 | Sonderegger et al. ....... 707/103 |
| 6,330,689 | B1 | | 12/2001 | Jin et al. ..................... 714/15 |
| 6,467,085 | B1 | * | 10/2002 | Larsson ..................... 717/165 |
| 6,564,215 | B1 | * | 5/2003 | Hsiao et al. .................. 707/8 |
| 6,643,652 | B1 | * | 11/2003 | Helgeson et al. ............ 707/10 |

(Continued)

OTHER PUBLICATIONS

B.S. Rao et al., "A Decentralized Bayesian Algorithm for Identification of Tracked Targets," IEEE Transactions on Systems, Man, And Cybernetics, vol. 23., No. 6., Nov. 1993.

*Primary Examiner*—Shahid Alam
*Assistant Examiner*—Emeka Ebirim
(74) *Attorney, Agent, or Firm*—Samuel A. Kassatly

(57) ABSTRACT

The use of a centralized version table allows for efficient object switching. Rather than synchronizing all database agents to recognize a newly created file as containing the most recent version of a given object, database agents requiring access to the given object need only consult the centralized version table to learn file identity information. That is, the database agents consult the centralized version table to determine which of the files associated with a given object contain the most recent version of the given object. Mechanisms associated with the use of the centralized version table also provide for efficient recovery from a failure that has occurred during an object switching transaction.

26 Claims, 7 Drawing Sheets

U.S. PATENT DOCUMENTS

| | | |
|---|---|---|
| 6,772,161 B1 * | 8/2004 | Mahalingam et al. ......... 707/10 |
| 6,856,993 B1 * | 2/2005 | Verma et al. ............... 707/101 |
| 2003/0120685 A1 * | 6/2003 | Duncombe et al. ......... 707/200 |
| 2003/0154238 A1 * | 8/2003 | Murphy et al. ............. 709/201 |
| 2004/0064488 A1 * | 4/2004 | Sinha ........................ 707/204 |
| 2004/0133577 A1 * | 7/2004 | Miloushev et al. ........... 707/10 |

* cited by examiner

SYSTEM AND METHOD FOR DECOUPLING OBJECT IDENTIFICATION FOR THE PURPOSE OF OBJECT SWITCHING IN DATABASE SYSTEMS

PRIORITY CLAIM

The present application claims the priority of Canadian patent application, Serial No. 2,422,161, which is titled "Decoupled Object Identification for Object Switching in Database Systems," which was filed on Mar. 14, 2003, with the Canadian Patent Office, by Robert T. Berks, Miroslaw Adam Flasza, Matthew Albert Huras, Leo Tat Man Lau, Keriley K. Romanufa, Aamer Sachedina, and Michael Jeffrey Winer, and which is incorporated herein by reference.

FIELD OF THE INVENTION

The present invention generally relates to database management systems, and more particularly to object switching in database systems. More specifically, this invention pertains to decoupling object identification for such object switching without synchronizing or informing all the database agents of the object switch.

BACKGROUND OF THE INVENTION

Data object shadowing is a known method for directing a database management system (DBMS) operating on a data processing system to switch objects in a database stored in a memory associated with that data processing system. However, known data object shadowing methods used by the DBMS in response to queries being processed by that DBMS cause the interaction between the DBMS and the database to slow down. Consequently, the DBMS may appear to respond poorly to these queries. In this sense, the DBMS working in conjunction with the database is said to suffer from "low availability". This is a significant drawback for users that desire "high availability" from DBMSs operating with databases.

The operational combination of a DBMS operating with a database may be called a database system. The combination of known data object shadowing methods and other DBMS operations such as data loading or index reorganization can create and build a shadow object on the side, i.e., placing that shadow object in some other memory location. Concurrently, the DBMS maintains an original object that is continuously made available to users during the entire duration of the DBMS operation. At some future time, the DBMS operation may include steps for replacing the shadow object with the original object so that the shadow object then becomes what may be called the "real" object. This process of allowing a shadow object to become a real object may be called "object switching".

In a large-scale database system, there may be hundreds of agents working concurrently. Each agent is likely working for a different user to access data such as objects stored in a database of the large-scale database system. Given this scenario, several different users could attempt to access the same database object simultaneously. A database object handle (for example, DB_Obj_Hdl) identifies each object stored in the database. Eventually, data are stored in a file system of the large-scale database system. Each file is identified in the file system by a file handle (for example, FS_File_Hdl). As such, database agents may maintain a local mapping of a database object handle to a file handle (such as, DB_Obj_Hdl to FS_File_Hdl).

Assume a particular object, object1 already exists and is stored in a particular file, file1.0. The object handle for object1 is DB_Obj_Hdl=object1 and the file for storing object1 is FS_File_Hdl=file1.0. A local mapping (object1-> file1.0) may be maintained by each database agent that had performed input or output (I/O) operations on object1. Where one of the database agents creates a shadow object of object1, a different file, such as file1.1, must be used to store this shadow object in the file system. Note that the physical file name containing the object is coupled to the version of the object (file1.1 as opposed to file1.0).

When this database agent has completed acting upon the shadow object, the object is assumed to have changed. To enable access by other database agents to the most up-to-date object, there is a need to perform an object switching transaction, that is, to make the shadow object the real object.

This object switching transaction is performed by informing all other database agents to map object1 to file1.1 rather than to file1.0. Future I/O operations (sometimes called IO operations) performed by any database agents against object1 will therefore be directed to file1.1 instead of being directed to file1.0. Informing other database agents about the switch may be called synchronization. However, an immediate synchronization among all database agents may be extremely expensive to realize when measured in terms of database system performance, especially in a large-scale database system. Extra processing time is expended by the DBMS to effect the synchronization, that is, to make each agent aware of the current "real" data object.

Thus, there is need for a system and associated method for monitoring or otherwise providing the location of shadow and real database objects without using synchronization among all database agents. The need for such system and method has heretofore remained unsatisfied.

SUMMARY OF THE INVENTION

The present invention satisfies this need, and presents a system, a computer program product, and an associated method (collectively referred to herein as "the system" or "the present system") for directing a DBMS to switch a shadow data object identification with a real data object identification. The shadow data object is associated with the real data object and the shadow object and the real object are stored in a database (which is stored in the memory). The DBMS is adapted to serve agents requesting access to the current data object. The processing effort exerted by the data processing system when utilizing the present system is reduced in comparison to the method requiring the DBMS to synchronize (that is, inform) the agents that a valid real object identification is the shadow data object identification and not the real data object identification.

By decoupling the versioning from the physical file name and introducing a centralized version table, explicit synchronization among all database agents may be eliminated. Explicit synchronization may be eliminated by preventing database agents from performing I/O operations against a given object while an object-switching transaction is being performed.

Once the object switching transaction is complete, any database agents that need to perform 1/0 operations against the given object will find that the given object has been switched and that an indication of the new version is available in the centralized version table. This may be termed a lazy approach. The responsibility for determining the current Version_ID for the given database object is transferred to database agents that need to perform I/O operations against the given database object. The current Version_ID is determined by consulting the centralized version table. Advantageously, those database agents that will not perform another I/O operation against the switched object need not learn that the object has been switched.

In addition, embodiments of the present system do not require synchronization amongst all agents. The method of one aspect of the present system allows each database agent to learn that an object has been switched on the next access of that object. In a further aspect of the present system, an object switching transaction may be performed on a given object in a fixed number of instructions regardless the size of the given object.

In accordance with an aspect of the present system, there is provided a method of switching for a database management system. This database management system is adapted to manage a database storing a given database object, wherein multiple versions of the given database object may be stored in a plurality of files, each of the plurality of files having a file handle, where an object handle for the given database object is related to a first one of the file handles.

The method of switching comprises locating an indication of a version of the first one of the file handles related to the object handle for the given database object, preventing database agents from accessing the indication of the version, and changing the indication of the version to a value that indicates a second one of the file handles. Further, a database management system is provided for carrying out this method and a computer readable medium is provided for allowing a general-purpose computer to perform this method.

In accordance with an aspect of the present invention, there is provided a switching method comprising: locating an indication of a version of the first one of the file handles related to the object handle for the given database object; preventing database agents from accessing the indication of the version; and changing the indication of the version to a value that indicates a second one of the file handles. This method is provided for a database management system adapted to manage a database storing a given database object, wherein multiple versions of the given database object may be stored in a plurality of files, each of the plurality of files having a file handle, and where an object handle for the given database object is related to a first one of the file handles.

In accordance with another aspect of the present system the database management system comprises: means for locating an indication of a version of the first one of the file handles related to the object handle for the given database object; means for preventing database agents from accessing the indication of the version; and means for changing the indication of the version to a value that indicates a second one of the file handles. These means are provided for a database management system adapted to manage a database storing a given database object, wherein multiple versions of the given database object may be stored in a plurality of files, each of the plurality of files having a file handle, and where an object handle for the given database object is related to a first one of the file handles.

In accordance with yet another aspect of the present invention, there is provided a computer program product comprising: code for locating an indication of a version of the first one of the file handles related to the object handle for the given database object; code for preventing database agents from accessing the indication of the version; and code for changing the indication of the version to a value that indicates a second one of the file handles. The computer program product has a computer readable medium tangibly embodying computer executable code for directing a database management system to manage a database storing a given database object, wherein multiple versions of the given database object may be stored in a plurality of files, each of the plurality of files having a file handle, and where an object handle for the given database object is related to a first one of the file handles.

In accordance with yet another aspect of the present invention, there is provided a method of activating a database instance comprising scanning a tablespace directory for evidence of object shadowing. The evidence of object shadowing is an association of at least two files with a given database object among the plurality of database objects. The method of activating a database instance also comprises selecting a database object for which evidence of object shadowing has been found, thereby giving a selected database object, the selected database object having at least two associated files.

In addition, the method of activating a database instance comprises attempting to read sequence information and object marking indications from at least two associated files and determining which of the associated files contains a current version of the selected database object based on the sequence information and object marking indications. This method of activating a database instance utilizes a database management system adapted to manage a database storing a plurality of database objects, wherein multiple versions of database objects may be stored in a plurality of files, each of the plurality of files having a file handle.

In accordance with yet another aspect of the present invention, there is provided a database management system comprising: means for scanning a tablespace directory for evidence of object shadowing, where the evidence of object shadowing is an association of at least two files with a given database object among the plurality of database objects; means for selecting a database object for which evidence of object shadowing has been found, thereby giving a selected database object, the selected database object having at least two associated files; means for attempting to read sequence information and object marking indications from at least two associated files; and means for determining which of the associated files contains a current version of the selected database object based on the sequence information and object marking indications. This database management system is adapted to manage a database storing a plurality of database objects, wherein multiple versions of database objects are stored in a plurality of files, each of the plurality of files having a file handle and the database management system for activating a database instance.

In accordance with yet another aspect of the present system, there is provided a computer program product comprising: code for scanning a tablespace directory for evidence of object shadowing, where the evidence of object shadowing is an association of at least two files with a given database object among the plurality of database objects; code for selecting a database object for which evidence of object shadowing has been found, thereby giving a selected database object, the selected database object having at least two associated files; code for attempting to read sequence information and object marking indications from at least two associated files; and code for determining which of the associated files contains a current version of the selected database object based on the sequence information and object marking indications. The computer program product has a computer readable medium tangibly embodying computer executable code for directing a database management system adapted to manage a database storing a plurality of database objects, wherein multiple versions of database objects are stored in a plurality of files, each of the plurality of files having a file handle and the database management system for activating a database instance.

BRIEF DESCRIPTION OF THE DRAWINGS

The various features of the present invention and the manner of attaining them will be described in greater detail with reference to the following description, claims, and drawings, wherein reference numerals are reused, where appropriate, to indicate a correspondence between the referenced items, and wherein:

DETAILED DESCRIPTION OF PREFERRED EMBODIMENTS

The following definitions and explanations provide background information pertaining to the technical field of the present invention, and are intended to facilitate the understanding of the present invention without limiting its scope:

Database systems, also referred to as Database Management System (DBMS): Software used to manage databases. Generally provides services by which applications can access and manipulate the data in the databases under its control, and other services for the administration, security, and integrity of the databases.

Tuple/Record: In database management systems, a set of information. Records are composed of fields, each of which contains one item of information. A set of records constitutes a file. For example, a personnel file might contain records that have three fields: a name field, an address field, and a phone number field. A record corresponds to a row in a table.

The following detailed description of the embodiments of the present invention does not limit the implementation of the invention to any particular computer programming language. The present invention may be implemented in any computer programming language provided that the Operating System (OS) provides the facilities that may support the requirements of the present invention. An embodiment may be implemented in the C or C++ computer programming language (or other computer programming languages in conjunction with C/C++). Any limitations presented would be a result of a particular type of operating system, computer programming language, or data processing system, and would not be a limitation of the present invention.

Figure 1:
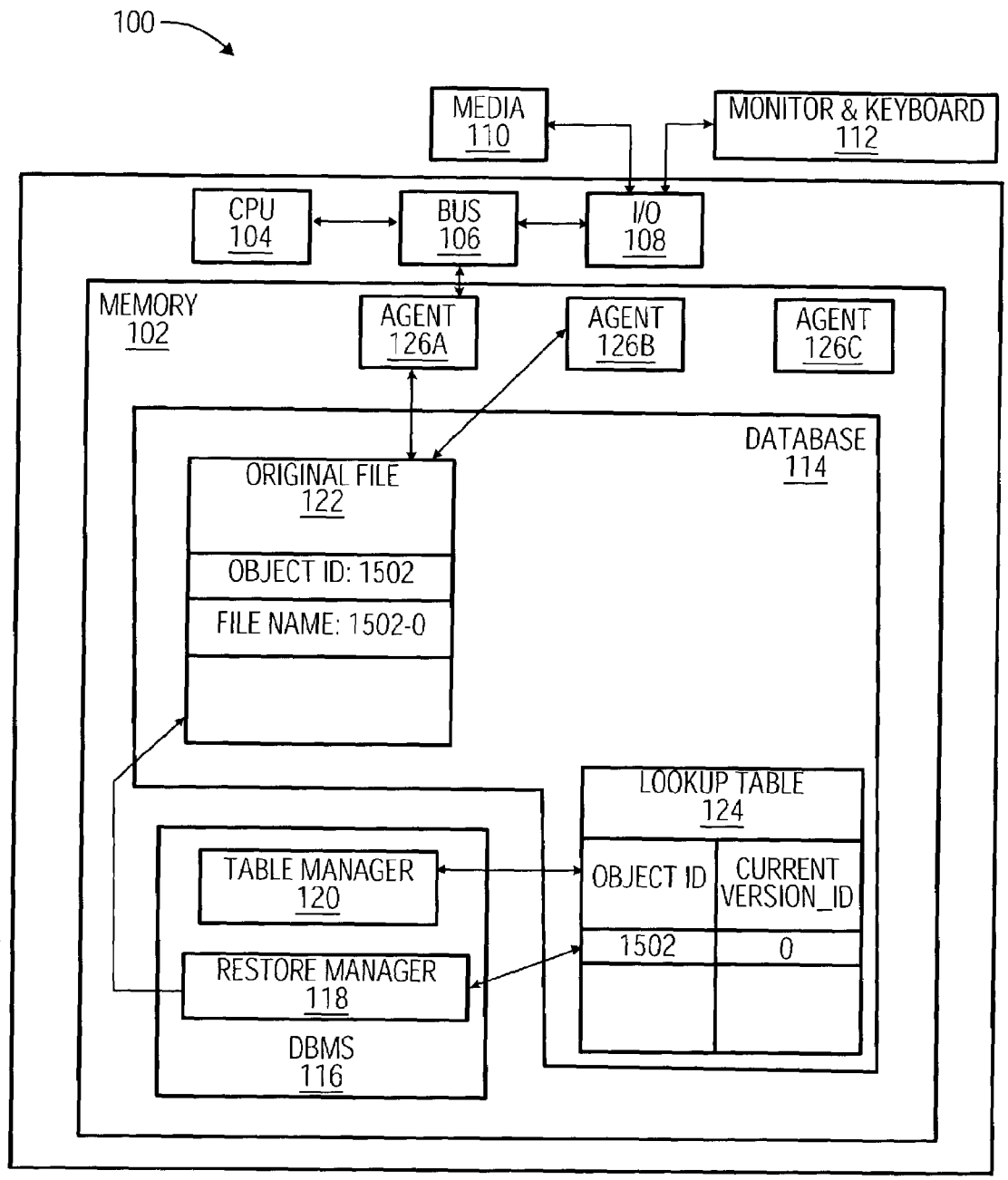
FIG. 1 is a block diagram of an exemplary database system in which a system and method for decoupling object identification for the purpose of object switching in database systems can be used.

FIG. 1 illustrates an exemplary database system 100 with a CPU 104, a bus 106, an input/output (I/O) module I/O 108, and a memory 102. Via the bus 106 and I/O 108, the CPU 104 may communicate with a monitor and keyboard 112 and a storage media 110. Furthermore, the CPU 104 may access the memory 102 via the bus 106. The memory 102 comprises a database 114 and an associated database management system (DBMS) 116. The database 114 is accessed by database agents: agent 126A; agent 126B; and agent 126C (collectively or individually 126). The database 114 comprises an original file 122 storing an object with an object ID of 1502. The original file 122 has file name of "1502-0". The database 114 also comprises a lookup table 124. Accordingly, the DBMS 116 comprises a table manager 120 for managing the lookup table 124 and a restore manager 118.

The exemplary database system 100 may be loaded with software for executing methods exemplary of this invention from the storage media 110 which could be a disk, a tape, a chip or a random access memory containing a file downloaded from a remote source. Alternatively, this software can be saved on a suitable storage medium such as a diskette, a CD, a hard drive, or like devices.

The lookup table 124 is a centralized version table that maintains versioning information. The lookup table 124 comprises "version tuples". Each version tuple comprises an object handle entry and a version entry, for example, DB_Obj_Hdl, Version_ID. The Version_ID found in the version entry indicates the current version for the object represented by the handle in the object handle entry. In one embodiment of the present invention, the value of Version_ID may be either 0 or 1. In the file system, each database object could reside in one of two files, namely, filen.0 or filen.1.

As used herein, "0" refers to filen.0, and "1" refers to filen.1. The value 0 does not necessarily mean "current" version. Similarly, 1 does not necessarily mean "shadow" version. The Version_ID is introduced to decouple the versioning from the physical file name. In addition to the centralized version table, each database agent 126 may manage an associated local database object to file handle mapping with the addition of Version_ID. The mapping becomes (DB_Obj_Hdl, Version_ID ->FS_File_Hdl). Therefore, for a given database object, each database agent 126 could record at most two file handles, one for Version_ID 0 and one for Version_ID 1.

In the examples discussed herein, only two values are used for Version_ID, namely 0 and 1. Version 0 does not necessarily refer to the current version, nor does version 1 necessarily refer to the shadow version. The current Version_ID stored in the version entry of the version tuple indicates to the database agents 126 which version is the current version of a given object. The lookup table 124 stores information relating to all the objects that have been versioned. If a version tuple for a given object does not exist in the lookup table 124, the current Version_ID for the given object may be defaulted to 0 when the object is created.

As will be apparent to a person skilled in the art, the version indication (Version_ID) need not be limited to binary (i.e., 0 and 1). There may be multiple versions of an object created and the table manager 120 need only be adapted to maintain a version indication for the file version of the current object in the lookup table 124. That is, the version indication will indicate to database agents 126 the file version containing the most up-to-date object for which any changes are complete.

Before any I/O operations may be performed against a given database object, the database agent 126 that is to perform the I/O operation locates a version tuple in the lookup table 124 that corresponds to the given database object. Once the version tuple is located, the version tuple may be locked in a SHARED mode. Locking the version tuple in a SHARED mode can prevent the table manager 120 from attempting an object switching transaction on the database object before the I/O operation is complete. Once the SHARED lock is acquired (i.e., the version tuple is locked in SHARED mode) by one database agent 126, any other database agent 126 that is required to perform I/O operations consults the lookup table 124 to determine which Version_ID should be used. If the other database agent 126 is to perform an I/O operation on an original object, the other database agent 126 accesses the file having the Version_ID found in the lookup table 124. If the other database agent 126 is to perform an I/O operation on a shadow object, the other database agent 126 toggles the Version_ID found in the lookup table 124 and accesses the file having the toggled Version_ID.

Once the Version_ID is determined, this Version_ID may be used with the DB_Obj_Hdl to learn the corresponding FS_File_Hdl. The database agent 126 may then perform I/O operations against the file with the corresponding FS_File_Hdl. When the I/O operation is complete, the version tuple may be unlocked so that other database agents 126 may perform an object switching transaction, if necessary.

Before performing an object switching transaction on a given database object, the table manager 120 determines whether a version tuple exists in the lookup table 124. If a version tuple does not yet exist, the table manager 120 creates a version tuple for the given database object. Once the version tuple has been created, the table manager 120 locates the version tuple and attempts to acquire an EXCLUSIVE lock on the version tuple. Locking the version tuple in EXCLUSIVE mode involves waiting for completion of all existing I/O operations against the given database object and preventing the start of any new I/O operations against the given database object. Once the EXCLUSIVE lock is acquired, the Version_ID in the version entry of the version tuple is toggled, i.e., changed from 0 to 1 or changed from 1 to 0. After the Version_ID has been toggled, the object switching transaction is complete. The version tuple is then unlocked so that I/O operations may be performed against the given database object.

By decoupling versioning from the physical file name and introducing a centralized version table (the lookup table 124), explicit synchronization among all database agents 126 may be eliminated. The explicit synchronization may be eliminated by preventing database agents 126 from performing I/O operations against a given object while the object switching transaction is occurring. Once the object switching transaction is complete, any database agents 126 that need to perform I/O operations against the given object will find that the given object has been switched and an indication of the new version is available in the lookup table 124. This may be termed a lazy approach. The responsibility for determining the current Version_ID a the given database object is transferred to database agents that need to perform I/O operations against the given database object. The current Version_ID is determined by consulting the centralized version table.

The time taken to perform the object switching transaction does not depend on the size of the object. After the lock is acquired in EXCLUSIVE mode, only a few instructions are required to toggle the Version_ID.

In a database system such as database system 100, database objects are logically identified by object IDs; object IDs are used to map an object to a physical storage location for the object such as the file used in the present example. In embodiments of the present invention, Version_ID allows the mapping of each object ID to multiple physical storage locations. The use of the shared lookup table 124 allows new versions to be created and updated without cross-agent synchronization and also allows the version switching to appear instantaneous.

Figure 4:
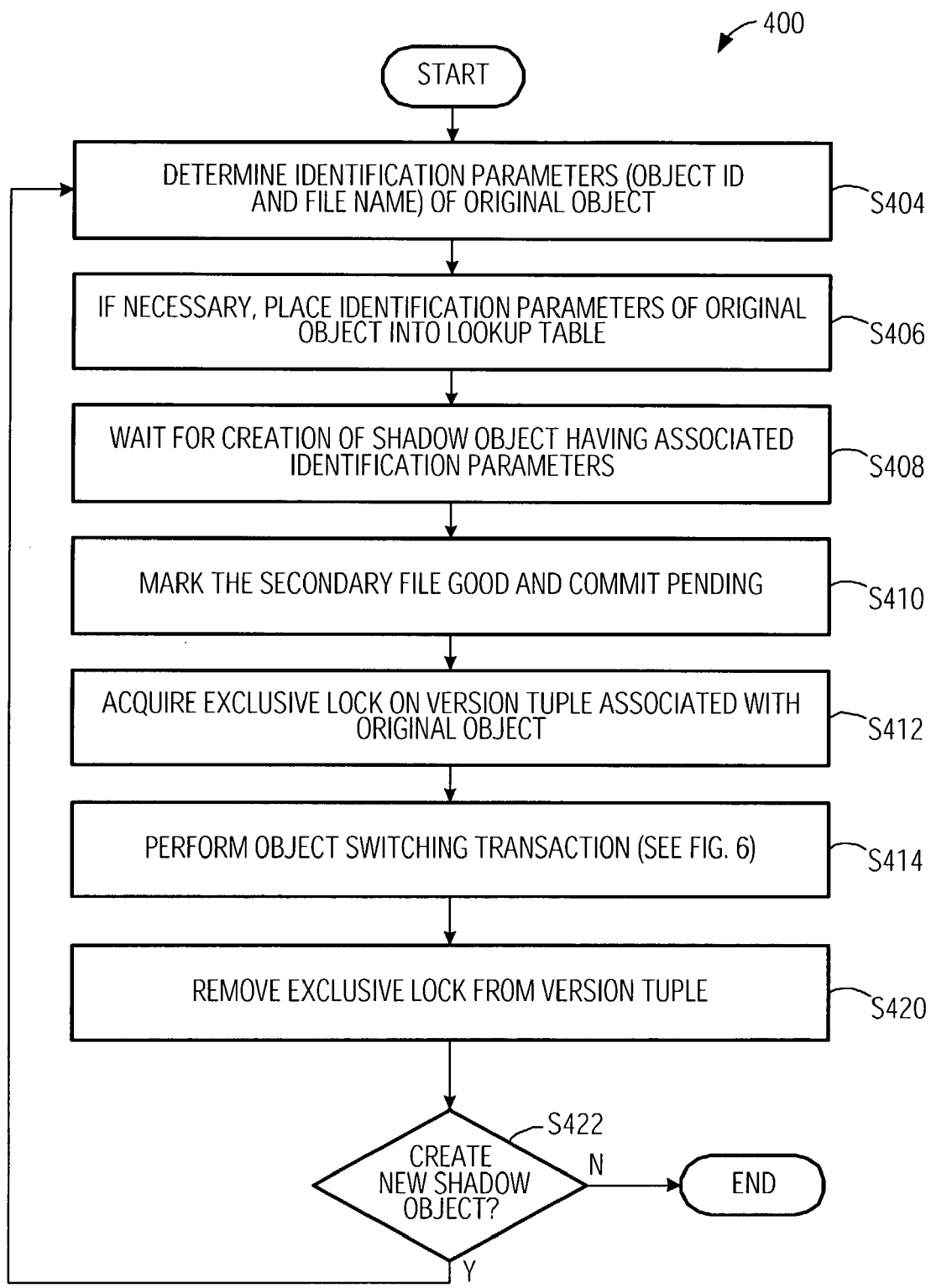
FIG. 4 is a process flow chart illustrating a method of creating a shadow object undertaken at the table manager, included in the exemplary database system of FIG. 1.

FIG. 4 illustrates steps of a method 400 undertaken at the table manager 120 to create a shadow object. Initially, the identification parameters are determined for an object that is to be the subject of an object switching transaction (step S404). The identification parameters are the object ID and the file name; the subject of the object switching transaction is the object stored in the original file 122.

If the identification parameters are not already in the lookup table 124, the table manager 120 places these identification parameters into the lookup table 124 (step S406). In step S408, a delay is introduced to allow the creation of a shadow (update) object which is then stored in a secondary file 202; the secondary file is shown in the database system 100 of FIG. 2. The shadow object has identification parameters associated with those of the original file 122. Once the table manager 120 has determined that the shadow object has been created, the secondary file 202 may be marked GOOD and COMMIT PENDING (step S410). At this point, the original file 122 stores the current object and the secondary file 202 stores the shadow object.

The creation of the shadow object often, but not always, involves creating a copy of the original object and then updating the object in some way. For example, if the object is an index to a table in the database 114, new records may be placed in the table and the index object may be rebuilt to reflect the table including the new records. As rebuilding an index object may take some time, the creation of a shadow object allows I/O access to the original object while the shadow object is subject to the rebuilding. Alternatively, the creation of the shadow object may involve re-creating an index without adding or updating any existing values. The purpose of recreating the index in this instance is to re-cluster the data so that related data are physically closer together.

Once the table manager 120 learns that the update to the shadow object is complete, the table manager 120 may acquire an EXCLUSIVE lock on the version tuple related to the shadow object (step S412). This EXCLUSIVE lock ensures that no database agents 126 may access the object stored in either the original file 122 or the secondary file 202. The table manager 120 then performs an object switching transaction as will be described hereinafter in conjunction with FIG. 6 (step S414). When the object switching transaction is complete, the EXCLUSIVE lock may then be removed from the version tuple (step S420). At this point, the original file 122 stores the shadow object and the secondary file 202 stores the current object.

If a new shadow object is to be created (step S422), the process returns to step S404. Otherwise, the process is complete.

The following describes three exemplary scenarios: a scenario wherein the database agent 126A accesses the original file 122; a scenario wherein the database agent 126C creates a shadow version of the original file 122; and a scenario wherein a hardware failure has occurred during an object switching operation and the restore manager 118 completes the object switching operation after the database instance is restarted.

Figure 5:
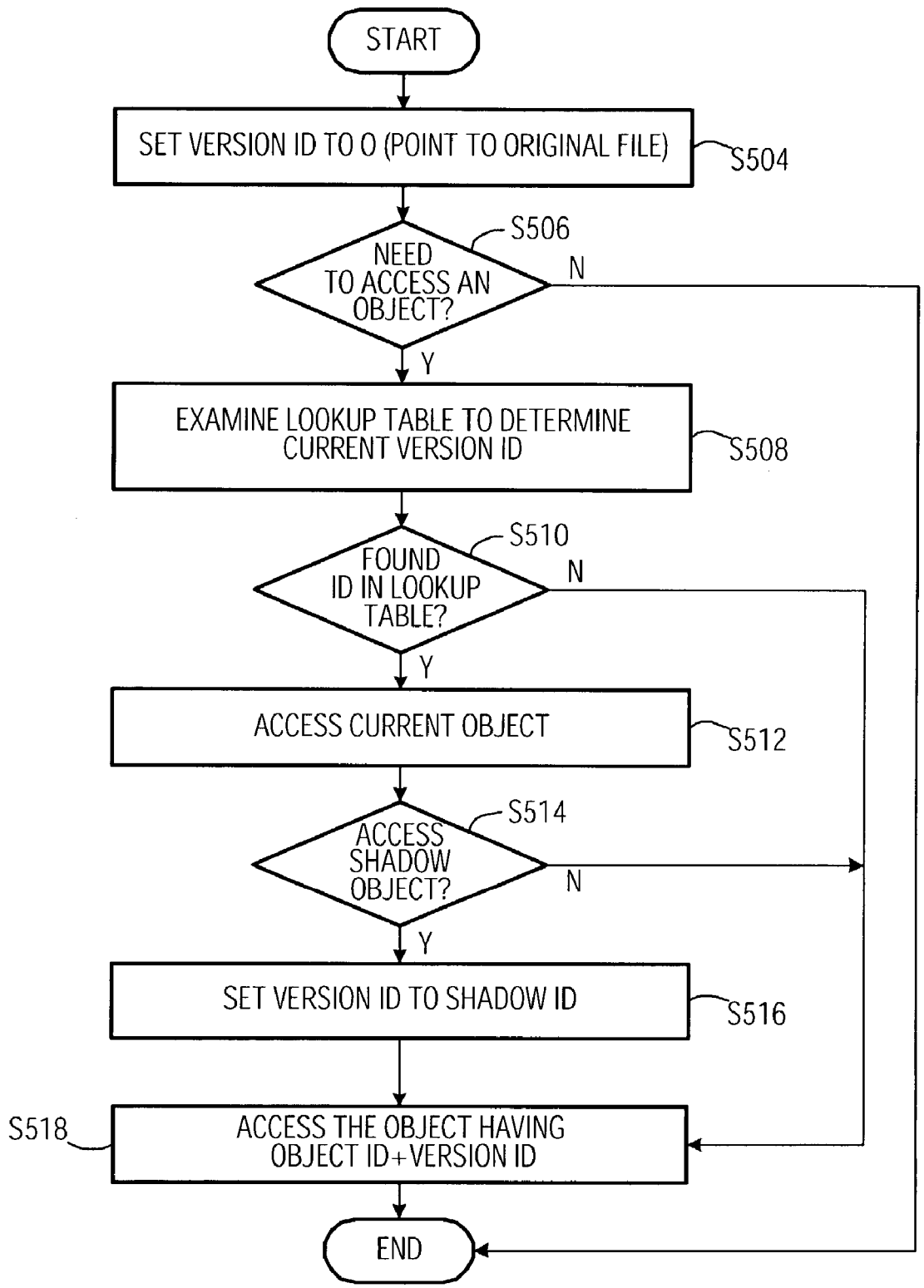
FIG. 5 is a process flow chart illustrating a method of accessing an object undertaken at a database agent.

The scenario wherein database agent 126A accesses the original file 122 is described in the process flow chart of FIG. 5. The Version_ID of object 1502 is, by default, set to 0 (step S504). The Version_ID is later used in combination with the object ID to determine a physical object storage location. Where it is determined (step S506) that the database agent 126A requires access to the original file 122, the lookup table 124 is accessed to determine the current Version_ID of the original file 122 (step S508). In other words, the lookup table 124 is searched for a version tuple with object ID of 1502 in the object handle entry. If the object ID is not found in the lookup table 124 (step S510), the default Version_ID (0) may be used.

If it is determined (step S506) that the database agent 126A does not require access to the original file 122, the process is complete.

Objects are not required to have a version tuple in the lookup table 124. It may be that only the objects that had been versioned before or are being versioned will have a version tuple in the lookup table 124. The practice of forcing only the versioned objects to have a version tuple in the lookup table 124 may be established to minimize storage requirements and lookup time.

If a version tuple having the object ID of the object in the object handle entry is found in the lookup table 124 (step S510), the Version_ID of the object is assigned the value of the Version_ID found in the version tuple and the current object can be accessed (S512). The first version tuple in the lookup table 124 of the database 114 illustrated in FIG. 1 relates to the object as the object ID 1502 is present in the object handle entry. In this case, the value of the Version_ID found in the version entry of the version tuple is 0 and the Version_ID of the object is set to 0.

If it is determined (step S514) that the database agent 126A requires access to a shadow object, the Version_ID of the object to be accessed by the database agent 126A is set to a shadow ID (step S516). That is, the Version_ID of the object to be accessed by the database agent 126A is assigned the "flipped" value of current Version_ID found in the version tuple in the lookup table 124. The flipped value is 0 if the value in the version tuple in the lookup table 124 is 1 and the flipped value is 1 if the value in the version tuple in the lookup table 124 is 0.

Where the database agent 126A requires access to a shadow object, the database agent 126A may use a combination of object ID (1502) and the Version_ID to construct a file name ("1502-1") based on the value of the Version_ID in the lookup table 124 (0) and the value of the Version_ID of the shadow (1). This file name may be used to access the shadow object (stored in the secondary file 202) of object 1502 (step S518).

Consider the scenario wherein the database agent 126C creates a shadow version of object 1502.

Figure 2:
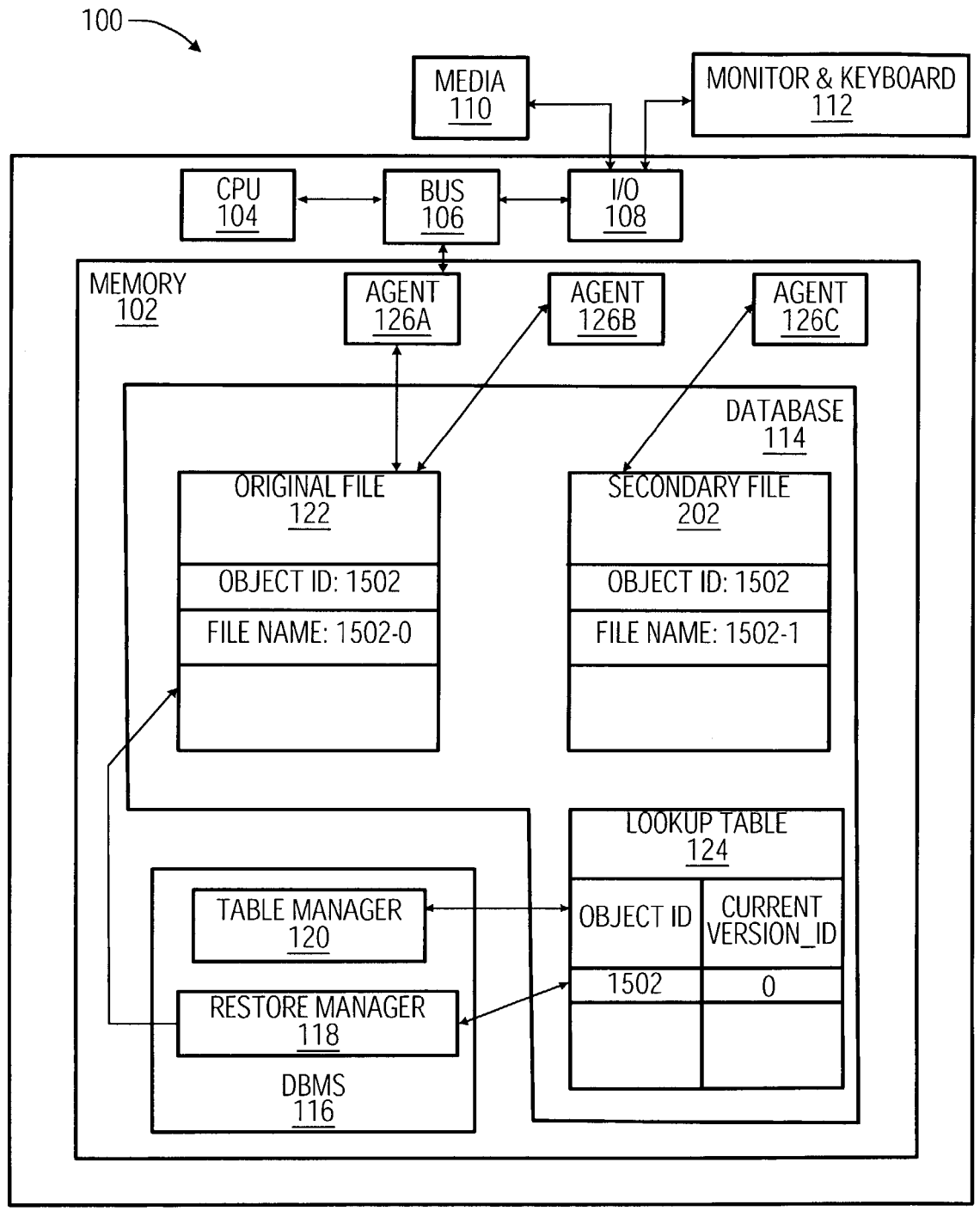
FIG. 2 is a block diagram of the exemplary database system of FIG. 1, wherein a shadow object has been created.

As discussed in conjunction with FIG. 4, the database agent 126C may need to create a shadow version of object 1502 when a version tuple does not exist in the lookup table 124 corresponding to object 1502. In this situation, the table manager 120 creates a new version tuple for object 1502 in the lookup table 124 (step S406, FIG. 4) with the current Version_ID set to 0. Subsequently, the database agent 126C creates a new file. This new file, illustrated as the secondary file 202 in FIG. 2, is initially marked BAD to indicate that the new file is not ready to be used.

A version tuple is created at this point rather than the point at which commit processing (to be discussed hereinafter) is complete. It is desirable to avoid failure of the commit processing due to lack of resources, such as the necessary shared memory to create the version tuple, at the commit time. In addition, the new version tuple allows the database agent 126C to access the shadow object. As described hereinbefore, the database agent 126 must first locate the appropriate version tuple in the lookup table 124 and flip the current Version_ID found in the version entry before a database agent 126 may determine a physical storage location (file) of a shadow object. Consequently, the lookup table 124 is setup to allow other database agents 126, such as the database agent 126A and the database agent 126B, to access the current version of object 1502 stored in the original file 122. Concurrently, the database agent 126C is allowed to access the shadow version of object 1502 stored in the secondary file 202.

When the database agent 126C has created (and updated) a shadow version of object 1502 in the newly created secondary file 202, the secondary file 202 may be marked GOOD and COMMIT PENDING. The secondary file 202 may be marked GOOD to indicate that it stores the most up-to-date version of object 1502 and is ready to be switched to the current object. Additionally, the secondary file 202 may be marked COMMIT PENDING to indicate that an object switching transaction remains to be performed. Before the actual object switching transaction takes place, the table manager 120 acquires an EXCLUSIVE lock on the version tuple related to object 1502 (step S412, FIG. 4). Holding such an EXCLUSIVE lock has the effect of making the table manager 120 the only element in the entire database system 100 that can access object 1502. That is, no database agents 126 can access either the current version or the shadow version of object 1502.

After the EXCLUSIVE lock is acquired, each of the actions required to perform the object switching transaction may be stored in a pending-list inside a commit log record. The pending-list is so named because the pending actions listed should be executed before the transaction can successfully commit. Notably, if an error occurs during the execution of any of these pending actions, the table manager 120 will neither be able to commit nor rollback the object switching transaction. The table manager 120 may re-try the pending actions until every pending action is completed successfully. The object switching transaction "commit process" begins when a commit log record is written to disk. Subsequently, the pending-list is executed sequentially.

Figure 6:
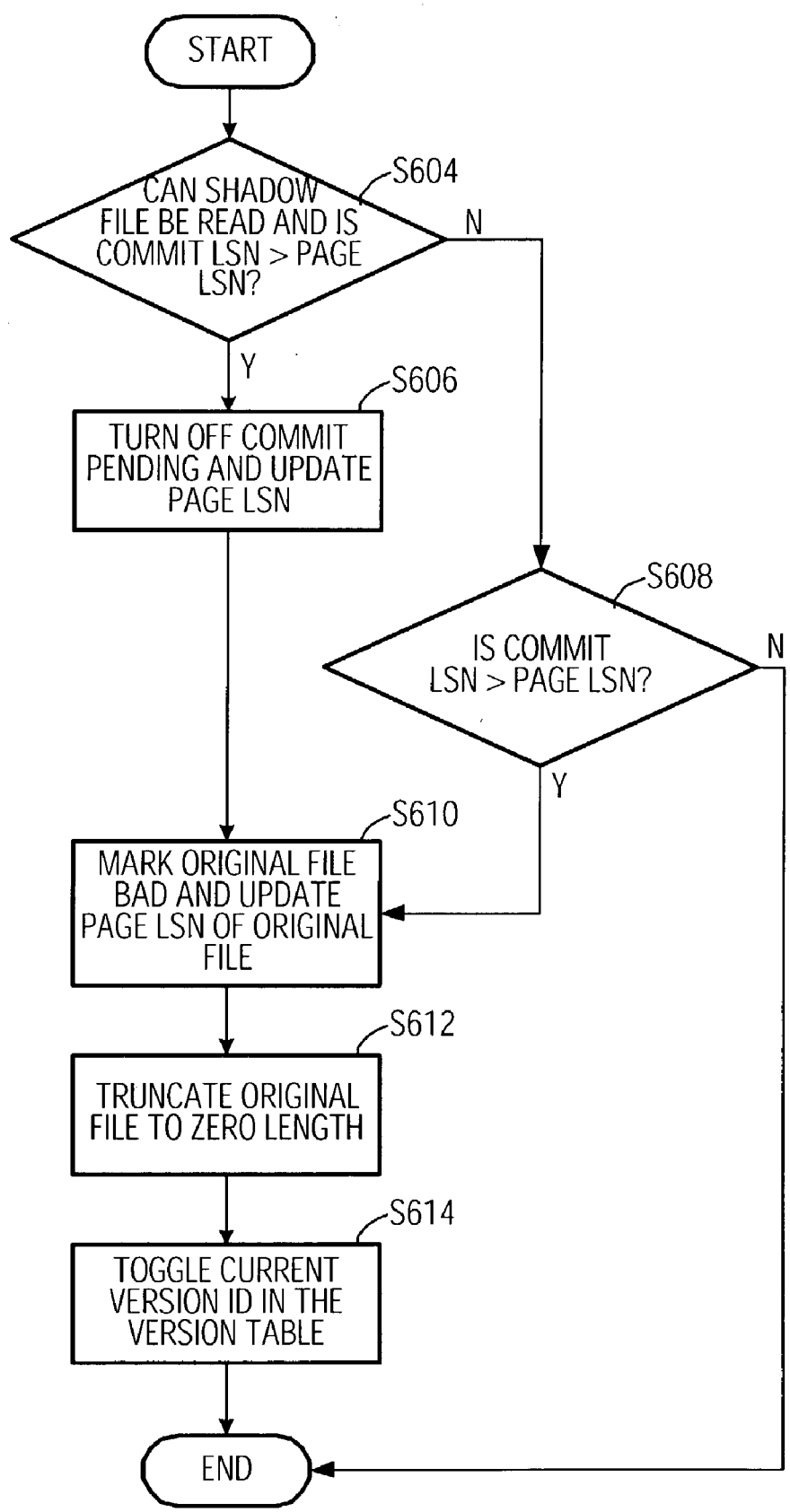
FIG. 6 is a process flow chart illustrating a method of performing an object switching transaction.

FIG. 6 illustrates the actions used to perform the object switching transaction. Within the database 114, a Log Sequence Number (LSN) is used to maintain an indication of the age of logs related to files. In particular, a "COMMIT" LSN refers to the LSN used for the commit log record and a "PAGE" LSN is the LSN of the latest log record written associated with a given page. As will be apparent to a person skilled in the art, a page is the smallest unit of consecutive bytes.

The object switching transaction begins with a determination of whether the shadow object (stored in the secondary file 202 in the present example) can be accessed and whether the COMMIT LSN of the secondary file 202 is greater than the PAGE LSN of the secondary file 202 (step S604). If the shadow object can be accessed and the COMMIT LSN is greater than the PAGE LSN, the COMMIT PENDING state of the secondary file 202 is removed and the PAGE LSN of the secondary file 202 is updated (step S606) to the value of the COMMIT LSN.

If either the shadow object can not be accessed or the COMMIT LSN of the secondary file 202 is less than the PAGE LSN of the secondary file 202 (or both), it is determined whether the COMMIT LSN is greater than the PAGE LSN (step S608). If the shadow object can not be accessed and the COMMIT LSN is less than the PAGE LSN, the object switching transaction is complete. Otherwise, the file containing the current object (the original file 122) is marked BAD and the PAGE LSN of the original file 122 is updated (step S610). Subsequently, the file containing the current version of the object (the original file 122) is truncated to zero length (step S612).

The version tuple for object 1502 is then located in the lookup table 124 and the current Version_ID is toggled (step S614) to indicate that the version has been updated. In this example, the updated current Version_ID is toggled to "1" as shown by the current Version_ID of lookup table 124 in FIG. 3.

In addition, the EXCLUSIVE lock on the version tuple related to object 1502 may be released and any database agent 126 that wishes to access object 1502 may learn that the current version is "1" as is stored in the secondary file 202 (file name "1502-1"), instead of the original file 122 (file name "1502-0"). Not only is the cost of the object switching transaction invariant on the size of the shadow object, performance the object switching transaction appears almost instantaneous.

Figure 3:
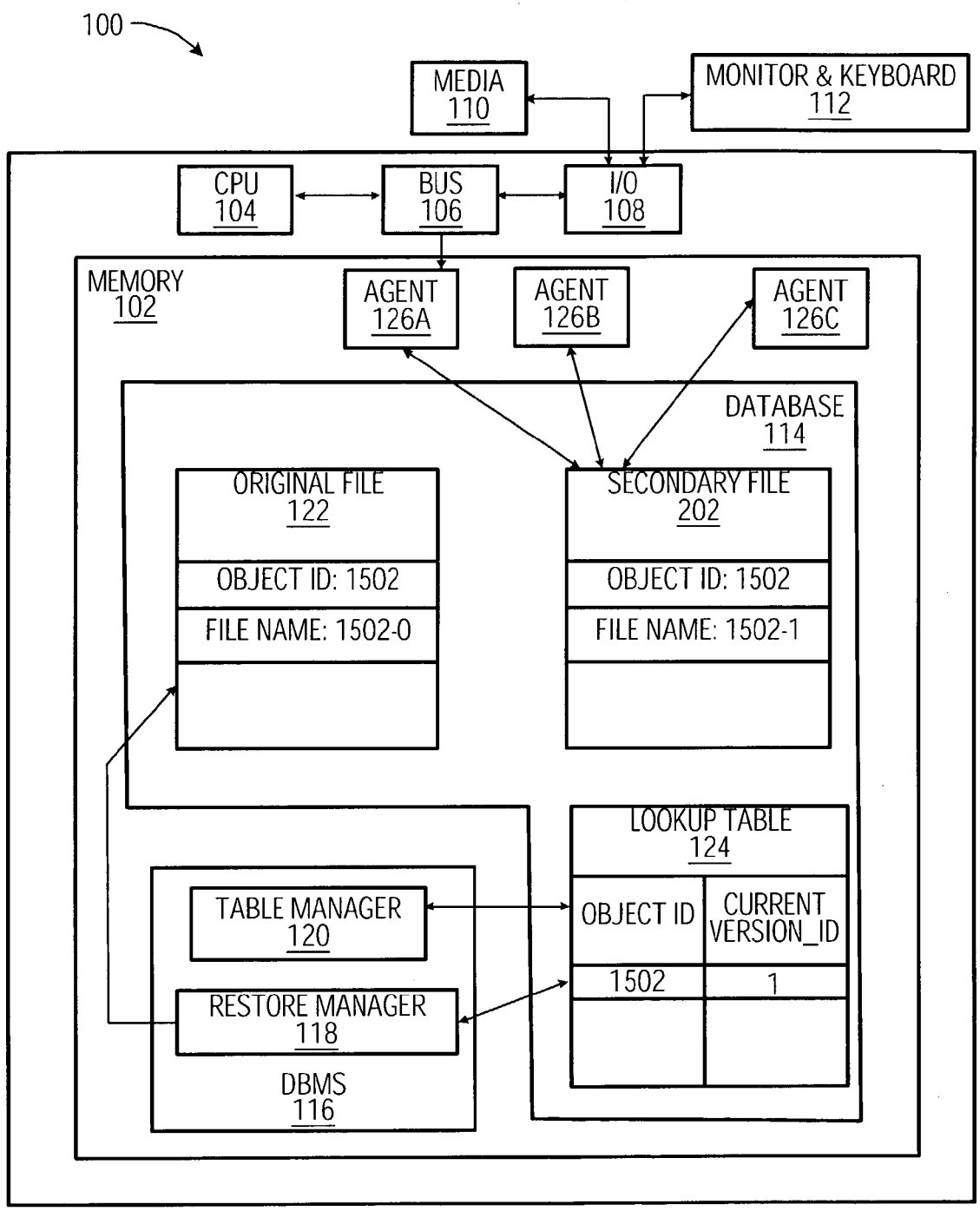
FIG. 3 is a block diagram of the exemplary database system of FIG. 1, wherein the shadow object of FIG. 2 is accessed by all database agents.

In addition, synchronization is not required between the database agent 126C (the database agent that created the shadow object) and the database agent 126A or the database agent 126B that previously had access to the older version of object 1502. When the database agent 126A or the database agent 126B later try to access object 1502, it will be found that the Version_ID in the version entry associated with object 1502 is set to 1. As a result, the secondary file 202 will be accessed instead of the original file 122 (as shown in FIG. 3). It is possible that object 1502 is versioned again before the database agent 126A makes its next access. At that time, the current Version_ID located inside the version entry will be set to 0 and the file with the file name "1502-0" (the original file 122) will be used again to store the current object of object 1502.

Between the time at which the commit log record is written and the time at which all the pending actions have been executed successfully, failures, such as in hardware or power, can bring down the database manager instance. In a system employing embodiments of the present invention, once the commit log record is written, the object switching transaction is guaranteed to be successful. Failure-recovery of an object switching transaction comprises the process of rebuilding the lookup table 124 (FIG. 7); the process of continuing the object switching transaction (FIG. 6).

As a failure recovery begins, the database 114 is activated. As part of the database activation, the tablespace directory is scanned to look for version "1" files. As will be apparent to a person skilled in the art, a tablespace directory is a location memory where all files for the same tablespace may be found. The version "1" files do not necessarily represent shadow objects. A file with a version number of "1" indicates that the current version of object 1502 is physically stored in the version "1" file instead of the version "0" file. Since the default version value is 0 when no version tuple is found in the lookup table 124, there is no need for action if no version "1" files exist. After a version "1" file is located within the tablespace directory, both the version "0" file and the version "1" file may be accessed to retrieve two attributes, namely the PAGE LSN and the object flags. Using the following rules in combination with these two attributes, the restore manager 118 can distinguish between the file that stores the shadow version of object 1502 and the file that stores the current version of object 1502.

If the version "0" file cannot be opened, or if both attributes can be read from both version files but the version "0" file is marked BAD, then the version "0" file cannot be used. In the latter case, the version "1" file is checked for a mark of BAD. If the version "1" file is not marked BAD, then the version "1" file can be considered to store the current version of object 1502. Accordingly, a version tuple may be created in the lookup table 124 to indicate that the current Version_ID is "1". Otherwise, the version "0" file will be assumed to store the current version of object 1502 but no entry will be created in the lookup table 124.

If the version "1" file cannot be opened, the version "0" file will be assumed to store the current version of object 1502 without a version tuple being created in the lookup table 124.

If both attributes can be read from both files and the version "0" file is marked GOOD but the version "1" file is marked BAD, then the version "1" file may be deleted and a new version tuple is not needed in the lookup table 124. A new version tuple is not needed because the default will use version "0" as a matter of course.

If both attributes can be read from both files and both files are marked GOOD, then the following rules apply:

If one of the files is marked as "COMMIT PENDING", then the marked file may be considered to store the shadow version of object 1502 and a version tuple may be created in the lookup table 124 indicating the appropriate version.

If neither of the files is marked with "COMMIT PENDING", the PAGE LSN may be used to determine which file stores the shadow version by comparison. If the PAGE LSN of the version "0" file is greater that the PAGE LSN of the version "1" file, then the version "0" file stores the shadow version of object 1502. Otherwise, if the PAGE LSN of the version "1" file is greater than the PAGE LSN of the version "0" file, then the version "1" file may be considered to store the shadow version of object 1502. It should be understood that these rules do not allow for both version files to have the same PAGE LSN.

After the scanning of the tablespace directory is finished, the lookup table 124 is updated to reflect which file stores a shadow version of a corresponding object and which file stores the current version of the corresponding object. The object switching transaction may then be continued from the point where the transaction left off before the failure.

Figure 7:
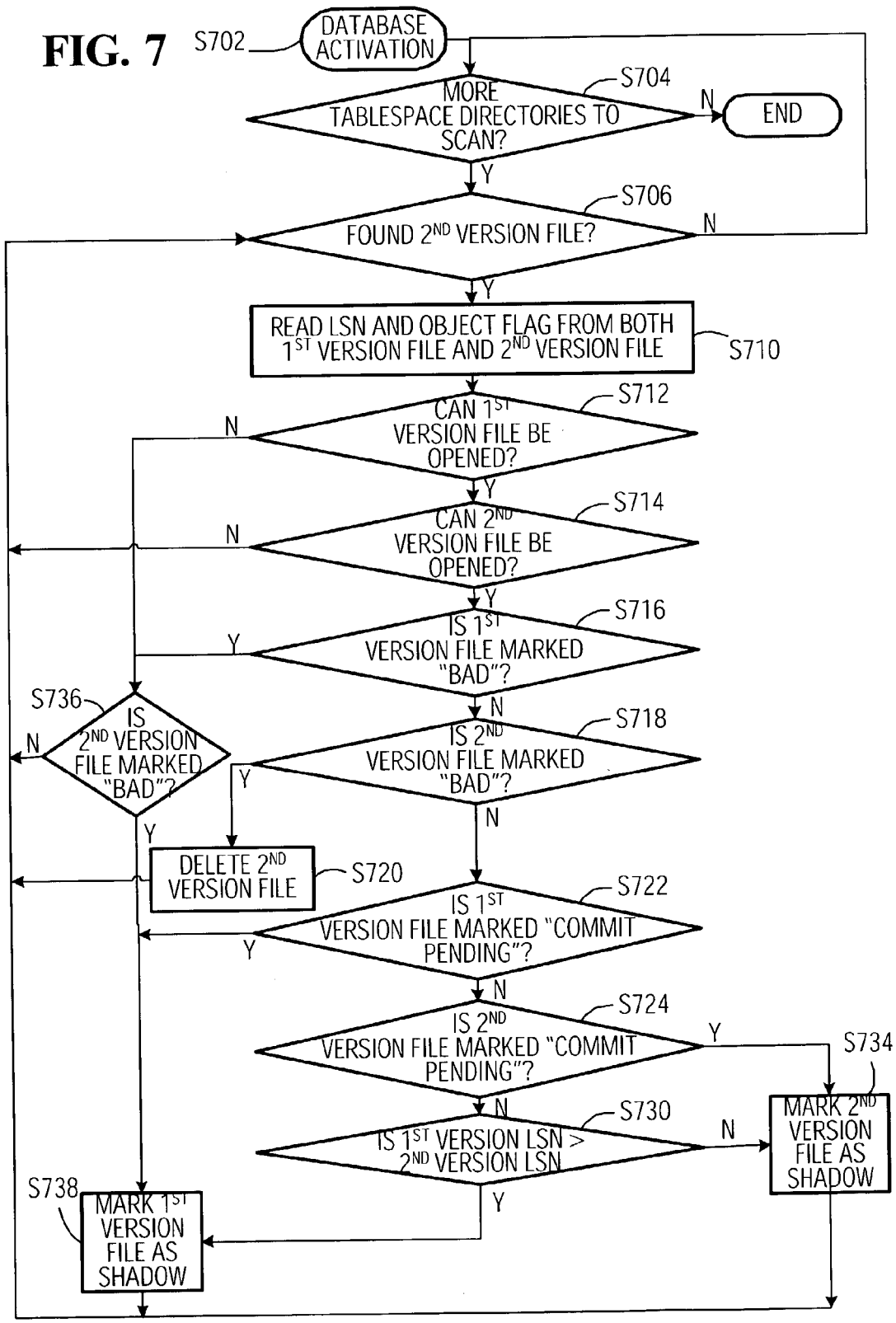
FIG. 7 is a process flow chart illustrating a method of activating a database and marking version files

FIG. 7 illustrates the implementation of these rules. In step S702, the database 114 is activated. It is then determined whether there are tablespace directories to scan (step S704). If there are tablespace directories to scan, one tablespace directory is selected and it is determined (step S706) whether the selected tablespace directory associates any objects with a Version_ID of 1. If the selected tablespace directory does not associate any objects with a Version_ID of 1, step S704 is repeated, i.e., it is determined whether there are any more tablespace directories to scan.

If there are no more tablespace directories to scan, the recovery-marking procedure is complete. If the selected tablespace directory does associate at least one object with a Version_ID of 1, it is considered that at least one object has two version files (a first version file and a second version file). One of the objects having two version files is selected and an attempt is made to read the PAGE LSN and object flags from both version files (step S710).

If it is determined that the first version file cannot be opened (step S712), it is further determined whether the second version file is marked BAD (step S736). If the second version file is marked BAD, the first version file is marked as storing the shadow object (step S738), i.e., the current Version_ID in the lookup table 124 is set to point to the second version file. Step S706 is then repeated to determined whether the selected tablespace directory has any further second version files to consider.

If it is determined that the first version file can be opened (step S712), it is further determined whether the second version file can be opened (step S714). If it is determined that the second version file cannot be opened, no marking is required and step S706 is repeated. If it is determined that the second version file can be opened, it is determined whether the first version file is marked BAD (step S716). If the first version file is marked BAD, it is determined whether the second version file is marked BAD (step S736). If the second version file is determined in step S736 to be marked BAD, the first version file is marked as storing the shadow object (step S738), i.e., the current Version_ID in the lookup table 124 is set to point to the second version file. Step S706 is then repeated to determine whether the selected tablespace directory has any further second version files to consider.

If the first version file is determined, in step S716, not to be marked BAD, it is determined whether the second version file is marked BAD (step S718). If the second version file is determined, in step S718, to be marked BAD, the second version file is deleted (step S720). Step S706 is then repeated to determine whether the selected tablespace directory has any further second version files to consider. If the second version file is determined, in step S718, not to be marked BAD, it is determined whether the first version file is marked COMMIT PENDING (step S722).

If it is determined that the first version file is marked COMMIT PENDING, the first version file is marked as storing the shadow object (step S738) and step S706 is repeated. If it is determined that the first version file is not marked COMMIT PENDING, it is determined whether the second version file is marked COMMIT PENDING (step S724).

If it is determined that the second version file is marked COMMIT PENDING, the second version file is marked as storing the shadow object (step S734), i.e., the current Version_ID in the lookup table 124 is set to point to the first version file, and step S706 is repeated. If it is determined that the second version file is not marked COMMIT PENDING, it is determined whether the PAGE LSN of the first version file is greater than the PAGE LSN of the second version file (step S730).

If it is determined that the PAGE LSN of the first version file is greater than the PAGE LSN of the second version file, the first version file is marked as storing the shadow object (step S738) and step S706 is repeated. Otherwise the second version file is marked as storing the shadow object (step S734) and step S706 is repeated.

The object switching algorithm has already been described hereinbefore in conjunction with FIG. 6. The object switching algorithm is revisited hereinafter in the context of failure recovery. Failures are considered at each segment of the logic and the restart logic is explained.

Step S606 represents the last update that needs to be performed on the secondary file 202 before the object stored in the secondary file 202 can truly become the current object. The rest of the logic of the object switching transaction (steps S610, S612 and S614) are updates to the current version and the lookup table 124 to reflect the object switching. Step S606 is only triggered if the PAGE LSN of the secondary file 202 is smaller then the COMMIT LSN; this avoids repeating this segment on a different object if the failure occurred much later in the commit processing.

If the failure happened before step S606 is completed, the COMMIT PENDING state of the secondary file 202 is used (step S724) to determine which file contains the shadow version of the object. The object switching transaction may then be restarted from the beginning. However, if the failure happened right after step S606 is completed, the COMMIT PENDING state will have been removed and the PAGE LSN of the object will be updated (increased).

Therefore, the relative PAGE LSN of the version files is used (step S730) to determine which file contains the shadow version of the object at the restart time. As such, steps S604 and S606 are not repeated when the object switching transaction continues, as the PAGE LSN comparison has already taken place. The object switching transaction may be entered directly at step S610.

Step S610 is used to mark the file containing the current version of the object BAD and is only executed if the PAGE LSN of that file is smaller then the COMMIT LSN of that file. If the failure happened before step S610 is finished, the file containing the current version of the object may still be marked GOOD and the PAGE LSN of the file may not have been updated. Therefore, steps S722, S724 and S730 may distinguish between files containing shadow and current versions of the object. Then, the object switching transaction may be entered directly at step S610. The need to execute steps S604 and S606 is obviated because the PAGE LSN of the file containing shadow version of the object has already been increased. If the failure happened just after step S610 is completed, the update to both the current and the shadow versions are complete. The logic represented by steps S716 and S718 will appropriately select the shadow version as the current version when the database manager is restarted.

Step S612, truncating the current version to zero length, is used to return the physical storage back to the file system. On restart, step S612 is only executed if the PAGE LSN of the file containing the object is smaller then the COMMIT LSN of that file.

Step S614, Toggling the current Version_ID in the version tuple found in the lookup table 124, is used to update the centralized lookup table 124 so that subsequent access to object 1502 will consider the current version to be 1 instead of 0. Step S610 is also only executed if the PAGE LSN of the file containing the object is smaller then the COMMIT LSN of that file.

It will be appreciated that an aspect of the invention is a computer program product having a computer-readable medium tangibly embodying computer executable instructions for directing a data processing system to implement any method described hereinbefore. It will be appreciated that the computer program product may be stored on a floppy disk, hard disk or other medium for long term storage of the computer executable instructions.

It will also be appreciated that an aspect of the invention is an article having a computer-readable signal-bearing medium, and having means in the medium for directing a data processing system to implement any method described hereinbefore. It will be appreciated that a supplier of the method may upload the article to a network (such as the Internet) and users may download the article via the network to their respective data processing systems.

It will be appreciated that variations of some elements are possible to adapt the invention for specific conditions or functions. The concepts of the present invention can be further extended to a variety of other applications that are clearly within the scope of this invention. Having thus described the present invention with respect to a preferred embodiment as implemented, it will be apparent to those skilled in the art that many modifications and enhancements are possible to the present invention without departing from the basic concepts as described in the preferred embodiment of the present invention. Therefore, what is intended to be protected by way of letters patent should be limited only by the scope of the following claims.

It is to be understood that the specific embodiments of the invention that have been described are merely illustrative of certain application of the principle of the present invention. Numerous modifications may be made to the system and method for decoupling object identification for the purpose of object switching in database systems invention described herein without departing from the spirit and scope of the present invention.

What is claimed is:

1. A processor-implemented management method for switching a database object in a database that stores a plurality of database objects, wherein multiple versions of database objects are stored in a plurality of files, each of the plurality of files being identified by a file handle, the method comprising:

creating a lookup version table that includes version tuples, wherein each version tuple comprises a file handle for a file and a version identification for the file, wherein the file handle and the version identification are decouplable, and wherein the version identification indicates a current version for the object represented by the file handle;

prior to a database object performing an operation against a selected database object, locating a version tuple in the lookup version table that corresponds to the selected database object;

upon locating the version tuple, locking the version tuple to prevent other database agents from performing an object switching transaction on the selected database object prior to performing the operation;

wherein decoupling the file handle from the version identification within the lookup version table eliminates explicit synchronization among all the database agents.

2. The method of claim 1, wherein upon performance of the operation, performing object switching and providing an updated version indication of a switched database object that corresponds to the selected database object.

3. The method of claim 2, wherein upon completion of the object switching, permitting another database agent to perform another operation against the switched database object.

4. The method of claim 3, further comprising determining whether the version tuple exists in the centralized version table.

5. The method of claim 4, wherein if it is determined that the version tuple does not vet exist, creating a new version tuple for the selected database object.

6. The method of claim 3, wherein locking the version tuple comprises
acquiring an exclusive lock on the version tuple.

7. The method of claim 5, further comprising releasing the exclusive lock on the version tuple so that new input and output operations against the selected database object is performed by the other database agents.

8. The method of claim 1, wherein the indication of the version is binary; and
wherein providing the updated version indication of the switched database object comprises toggling the value of the indication of the version.

9. The method of claim 1, further comprising distinguishing between a file that stores a shadow version of the selected database object and a file that stores a current version of the selected database object.

10. The method of claim 9, further comprising updating the lookup version table to reflect which file stores the shadow version of the database object and which file stores the current version of the database object.

11. A management computer program product having instruction codes stored on a computer-useable medium for switching a database object in a database that stores a plurality of database objects, wherein multiple versions of database objects are stored in a plurality of files, each of the plurality of files being identified by a file handle, the computer program product comprising:

a program code for creating a lookup version table that includes version tuples, wherein each version tuple comprises a file handle for a file and a version identification for the file, wherein the file handle and the version identification are decouplable, and wherein the version identification indicatesa current version for the object represented by the file handle;

prior to a database object performing an operation against a selected database object, a program code locating a version tuple in the lookup version table that corresponds to the selected database object;

upon locating the version tuple, a program code locking the version tuple to prevent other database agents from performing an object switching transaction on the selected database object prior to performing the operation;

wherein decoupling the file handle from the version identification within the lookup version table eliminates explicit synchronization among all the database agents.

12. The computer program product of claim 11, wherein upon performance of the operation, a program code performing object switching and providing an updated version indication of a switched database object that corresponds to the selected database object.

13. The computer program product of claim 12,
wherein upon completion of the object switching, a program code permitting another database agent to perform another operation against the switched database object.

14. The computer program product of claim 13, further comprising a program code for determining whether the version tuple exists in the centralized version table.

15. The computer program product of claim 14,
wherein if the program code determines that the version tuple does not vet exist, the program code creates a new version tuple for the selected database object.

16. The computer program product of claim 13,
wherein the program code for locking the version tuple acquires an exclusive lock on the version tuple.

17. The computer program product of claim 15, further comprising a program code for releasing the exclusive lock on the version tuple so that new input and output operations against the selected database object is performed by the other database agents.

18. The computer program product of claim 11, wherein the indication of the version is binary; and
wherein the program code for providing the updated version indication of the switched database object toggles the value of the indication of the version.

19. The computer program product of claim 11, further comprising a program code for distinguishing between a file that stores a shadow version of the selected database object and a file that stores a current version of the selected database object.

20. The computer program product of claim 19, further comprising a program code for updating the lookup version table to reflect which file stores the shadow version of the database object and which file stores the current version of the database object.

21. A processor-implemented management system for switching a database object in a database that stores a plurality of database objects, wherein multiple versions of database objects are stored in a plurality of files, each of the plurality of files being identified by a file handle, the system comprising:

a table manager for creating a lookup version table that includes version tuples, wherein each version tuple comprises a file handle for a file and a version identification for the file, wherein the file handle and the version identification are decouplable, and wherein the version identification indicates a current version for the object represented by the file handle;

prior to a database object performing an operation against a selected database object, the table manager locates a version tuple in the lookup version table that corresponds to the selected database object;

upon locating the version tuple, the table manager locks the version tuple to prevent other database agents from performing an object switching transaction on the selected database object prior to performing the operation;

wherein the table manager decouples the file handle from the version identification within the lookup version table to eliminate explicit synchronization among all the database agents.

22. The system of claim 21, wherein upon performance of the operation, a restore manager performs object switching and provides an updated version indication of a switched database object that corresponds to the selected database object.

23. The system of claim 22, wherein upon completion of the object switching, the table manager permits another database agent to perform another operation against the switched database object.

24. The system of claim 23, further comprising the table manager determining whether the version tuple exists in the centralized version table.

25. The system of claim 24, wherein if the table manager determines that the version tuple does not yet exist, the table manager creates a new version tuple for the selected database object.

26. The system of claim 23, wherein the table manager locks the version tuple by acquiring an exclusive lock on the version tuple.

* * * * *